United States Patent [19]
Morris

[11] 3,862,783
[45] Jan. 28, 1975

[54] CENTERING DEVICE WITH AN IMPROVED BALL RETAINER ARRANGEMENT

[75] Inventor: Charles W. Morris, Mount Clemens, Mich.

[73] Assignee: The Bendix Corporation, Southfield, Mich.

[22] Filed: Feb. 8, 1973

[21] Appl. No.: 330,556

[52] U.S. Cl. .................. 308/196, 33/178, 308/195, 308/6 R, 308/201
[51] Int. Cl. ............................................ F16c 13/00
[58] Field of Search ............ 308/201, 195, 196, 6 R; 33/178

[56] References Cited
UNITED STATES PATENTS

| | | | |
|---|---|---|---|
| 2,665,496 | 1/1954 | Wynne | 33/178 R |
| 2,792,635 | 5/1957 | Bird | 33/178 R |
| 3,316,649 | 5/1967 | O'Conner | 33/178 R |
| 3,503,661 | 3/1970 | Taylor et al. | 308/201 |

Primary Examiner—Charles J. Myhre
Assistant Examiner—R. H. Lazarus
Attorney, Agent, or Firm—John R. Benefiel

[57] ABSTRACT

An adjustable centering device of the type using a pair of members having opposed annular tapered surfaces formed thereon which together define an annular V-shaped groove, and which chamfered surfaces are adjustable toward or away from each other to adjust the radial position of a series of balls disposed therein with respect to the groove axis to engage the workpiece surface. The device features an easily fabricated retainer arrangement for retaining the series of balls so that during the adjustment the balls are prevented from dropping out of the groove. This retainer arrangement includes a pair of rings having opposing chamfers formed thereon, one ring carried by each member and which are disposed on either side of the groove to perform the retention function.

2 Claims, 2 Drawing Figures

PATENTED JAN 28 1975

3,862,783

CENTERING DEVICE WITH AN IMPROVED BALL RETAINER ARRANGEMENT

BACKGROUND OF THE INVENTION

1. Field of the Invention

This invention concerns centering devices, and more particularly such devices which utilize a series of balls disposed in a radial groove which balls are adjusted in position radially by means of axial movement of opposing groove faces.

2. Description of the Prior Art

Such centering devices as disclosed in U.S. Pat. No. 3,100,117 (and similar gaging devices as shown in U.S. Pat. No. 3,316,649) have heretofore utilized sleeve or other forms of retainers for the balls which retainers are formed with a plurality of holes, chamfered from the inside in order to prevent the balls from dropping out of the groove while allowing the radial movement thereof required. This form of retainer has heretofore been considered necessary since it will separate and space the balls, that is, maintain the balls apart from each other, and also maintain this spacing in different radial positions of the balls.

However, such a retainer adds considerably to the cost of manufacturing such devices since the openings therein are chamfered from the inside. This chamfering is necessary since if a straight sided hole is used, the retainer material must be kept thin to allow a reasonable range of adjustment, but such thinness would introduce a critical dimensioning of the balls to avoid possible trapping of the same under the retainer in the minimum diameter adjusted position.

This inside chamfer is difficult and costly to provide in a formed ring but if the ring is formed after drilling and chamfering in flat strip stock, the forming of the ring to proper tolerances is a rather difficult and costly process.

Another problem has been encountered in certain applications involving brinelling of the balls and the races, particularly for non-rotating applications, where the balls remain in the same circumferential position during insertion into and withdrawal from the workpiece, which problem could be alleviated if the complement of balls could be maximized.

Accordingly, it is an object of the present invention to provide a retainer arrangement for such devices which do not require machining of inside chamfer openings for the balls, so that manufacturing costs created by such machining are reduced.

It is a further object to provide a retainer arrangement which maximizes the complement of balls in each device so as to decrease the loading of each individual ball during use thereof.

SUMMARY OF THE INVENTION

These and other objects which will become apparent upon a reading of the following specification and claims are accomplished by a retainer arrangement consisting of a pair of opposed chamfered rings disposed about each annular tapered surface disposed to retain a series of unseparated balls to allow the maximum complement thereof.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
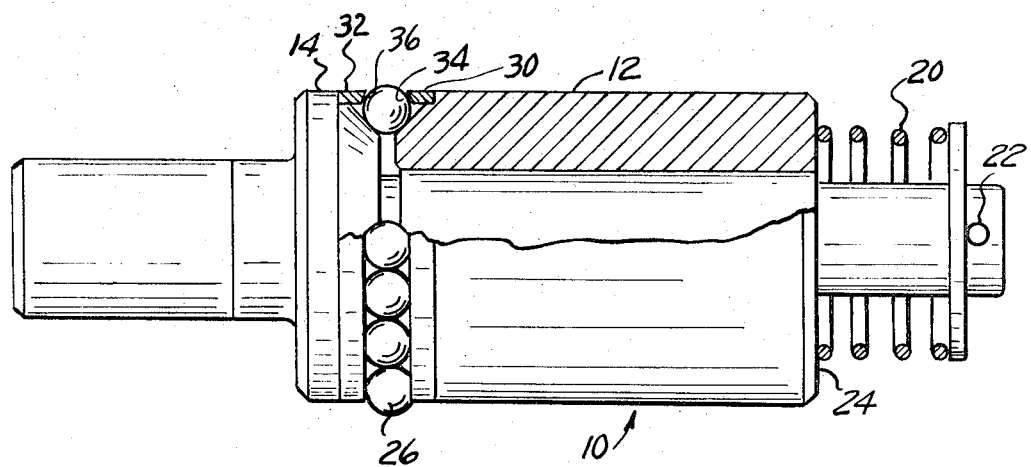
FIG. 1 is a partially sectional view of a centering device according to the present invention.

Referring to the drawings and particularly FIG. 1, a centering device 10 is depicted in partial section. This centering device 10 is intended to provide an adjustable diameter arbor for insertion within bores in workpieces for purposes well known in the gaging art, such as to precisely determine the center of the opening, or to check concentricity of a bore along its length.

This adjustment is carried out by means of a pair of members 12 and 14 each having formed thereon an annular tapering surface 16 and 18 respectively which annular surfaces are aligned but axially opposed to each other. Tapering surfaces 16 and 18 are adjustable axially towards or away from each other by relative axial movement of the members, which are biased to move tapering surfaces 16 and 18 together by means of a spring 20 secured by a retainer pin 22 to member 14.

Figure 2:
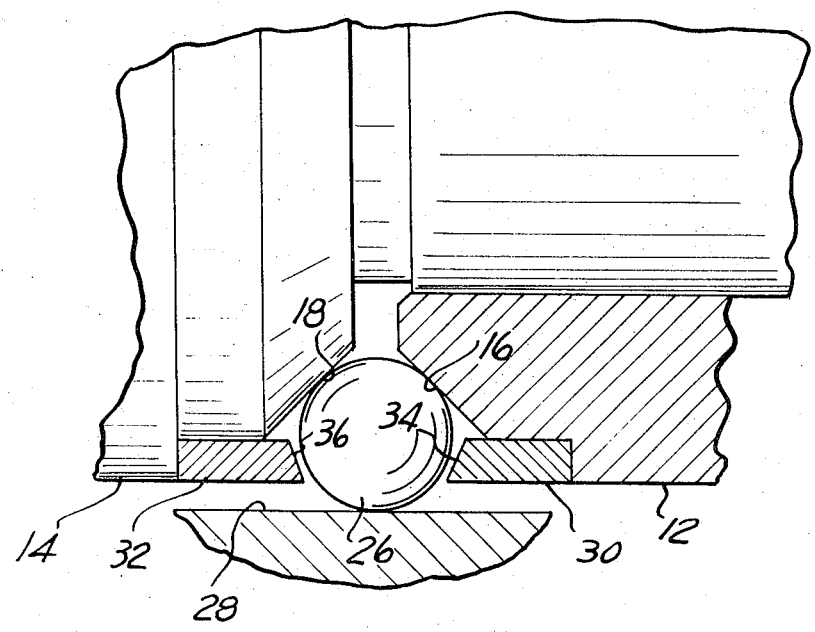
FIG. 2 is an enlarged partially sectional detail of the device shown in FIG. 1.

Annular opposing taper surfaces 16 and 18 form an annular V-shaped groove in which are disposed a plurality of balls 26, the radial positions of which are adjustable by the axial adjustment of the members 12 and 14 to thus provide an adjustable diameter arbor, since the balls 26 will be constrained from movement outward by engagement with the workpiece wall 28 (shown in FIG. 2) and inwardly by the annular taper surfaces 16 and 18 which are biased towards each other by the spring 20, in the manner well known in the art.

The centering device 10 according to the present invention, rather than utilizing a spaced series of balls separated by means of a retainer ring having chamfered openings therein, utilizes an unseparated series of balls 26 retained by means of a pair of retainer rings 30 and 32, one carried by each member 12 and 14, respectively. Each retainer ring 30 and 32 is formed with a chamfered surface 34 and 36 concentric with a respective taper surface 16 or 18 and which chamfer surfaces are disposed opposing each other and which have a reverse slope from the respective annular taper surface 16 and 18 so that the balls 26 are retained in the annular groove throughout the range of adjustment.

The number of balls 26 must be selected so that in the inmost position of adjustment interference between the balls 26 is not created. This can usually be accomplished by having one less ball from what would be a full complement in the outermost position.

It can be appreciated that this form of retainer can be very easily produced by simple turning operations on a lathe and indeed in actual practice has substantially reduced the cost of manufacture of the device, since the cost of the increased number of balls 26 is slight by comparison.

In addition, the increased number of balls 26 results in decreased loading on the individual balls reducing the tendency from brinelling, as outlined above.

This has been accomplished without creating undue wear of the balls as might be expected since it has been found the major wear occurs not during rotation of the device but rather insertion, since the balls cannot roll in response to contact of the workpiece wall 28.

Furthermore, the bunching of the balls 26 which occurs due to the lack of a spacing means does not affect the accuracy of the results as such a large proportion of the bore periphery is contacted by the balls, the effect of the open space is inconsequential.

As will be appreciated by those of ordinary skill in the art, the reverse form from that shown of this centering device 10 is also amenable to this improvement, i.e., balls which are adjustable to grip an outside diameter as of a shaft by merely appropriately reversing the various structural relationships.

I claim:
1. A centering device comprising:
   a first member having a tapered annular surface thereon;
   a second member having a tapered annular surface thereon axially aligned and juxtaposed to and opposing said tapered surface of said first member to form an annular groove therebetween;
   means for allowing adjustment of the relative position of said first and second members to produce movement of said annular taper surfaces toward or away from each other;
   a plurality of balls disposed in said groove;
   a pair of retainer rings, one carried by each of said first and second member so as to move together therewith, each retainer ring disposed extending about a respective annular taper surface of the respective first or second member, and having formed thereon a chamber surface concentric to and of reverse slope to that of the respective annular taper surface of the member on which it is carried and extending at least partially thereover, each of said retainer ring chamber surfaces extending axially toward each other to thereby retain said plurality of balls.
2. The device of claim 1 wherein said annular groove is filled with said balls in at least one adjusted position of said first and second members.

\* \* \* \* \*

UNITED STATES PATENT OFFICE
CERTIFICATE OF CORRECTION

Patent No. 3,862,783　　　　　　Dated January 28, 1975

Inventor(s) C. W. Morris

It is certified that error appears in the above-identified patent and that said Letters Patent are hereby corrected as shown below:

Column 4:

Claim 1:　Line 11:　Delete "chamber" and insert - - -chamfer- - -

Line 15:　Delete "chamber" and insert - - -chamfer- - -

Signed and sealed this 8th day of April 1975.

(SEAL)
Attest:

RUTH C. MASON
Attesting Officer

C. MARSHALL DANN
Commissioner of Patents
and Trademarks